US010367951B2

(12) United States Patent
Sweeney et al.

(10) Patent No.: US 10,367,951 B2
(45) Date of Patent: *Jul. 30, 2019

(54) WIRELESS RINGER

(71) Applicant: CenturyLink Intellectual Property LLC, Denver, CO (US)

(72) Inventors: Jeffrey M. Sweeney, Tucson, AZ (US); Michael C. Robinson, Shawnee, KS (US); Robert J. Morrill, Overland Park, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/946,184

(22) Filed: Nov. 19, 2015

(65) Prior Publication Data

US 2016/0080581 A1 Mar. 17, 2016

Related U.S. Application Data

(63) Continuation of application No. 13/421,664, filed on Mar. 15, 2012, now Pat. No. 9,219,826, which is a
(Continued)

(51) Int. Cl.
*H04M 19/04* (2006.01)
*H04W 68/00* (2009.01)
*H04B 1/3827* (2015.01)

(52) U.S. Cl.
CPC .......... *H04M 19/047* (2013.01); *H04B 1/385* (2013.01); *H04M 19/04* (2013.01); *H04W 68/005* (2013.01)

(58) Field of Classification Search
CPC ........... H04M 1/72577; H04M 1/6075; H04M 1/72516; H04M 1/7253; H04M 2203/053;
(Continued)

(56) References Cited

U.S. PATENT DOCUMENTS

| 4,653,087 A | 3/1987 | Galich |
| 5,315,636 A | 5/1994 | Patel |

(Continued)

FOREIGN PATENT DOCUMENTS

| GB | 2353186 | * | 2/2001 |
| GB | 2399253 | * | 9/2004 |

OTHER PUBLICATIONS

U.S. Appl. No. 13/421,664; NonFinal Office Action dated May 4, 2012; 12 pages.
(Continued)

*Primary Examiner* — Gennadiy Tsvey (57) ABSTRACT

Embodiments of the invention include a device and method for extending alerts for a wireless device. In one embodiment, a method for extending alerts for a wireless device includes linking the wireless device through a wireless connection with a wireless ringer module; wherein the wireless ringer module is removably coupled to a device having an interface for receiving and coupling with the wireless ringer module. The method further includes transmitting a signal to the wireless ringer that triggers an alert feature of the wireless ringer for notifying a user of an incoming communication in response to the wireless device receiving an indication of an incoming communication.

18 Claims, 7 Drawing Sheets

Related U.S. Application Data continuation of application No. 11/906,100, filed on Sep. 28, 2007, now Pat. No. 8,145,277.

(58) Field of Classification Search
CPC ......... H04M 2250/02; H04M 3/42068; H04M 3/42374; H04B 1/385; H04L 67/24
See application file for complete search history.

(56) References Cited

U.S. PATENT DOCUMENTS

| | | | |
|---|---|---|---|
| 5,495,236 A | 2/1996 | Minami | |
| 5,848,362 A * | 12/1998 | Yamashita | H04M 19/04 455/227 |
| 5,895,471 A | 4/1999 | King et al. | |
| 5,960,367 A * | 9/1999 | Kita | H04B 1/38 455/11.1 |
| 6,160,489 A | 12/2000 | Perry et al. | |
| 6,344,795 B1 | 2/2002 | Gehlot | |
| 6,424,251 B1 | 7/2002 | Byrne | |
| 6,435,690 B1 | 8/2002 | Till | |
| 6,903,655 B2 | 6/2005 | Stefanik | |
| 6,954,659 B2 | 10/2005 | Tushinsky et al. | |
| 6,993,349 B2 | 1/2006 | Martinez et al. | |
| 7,003,329 B1 | 2/2006 | Kirkpatrick | |
| 7,050,573 B2 | 5/2006 | Okazaki et al. | |
| 7,130,664 B1 * | 10/2006 | Williams | H04M 1/7253 340/384.6 |
| 7,623,030 B1 | 11/2009 | Popescu | |
| 7,627,351 B2 | 12/2009 | Rich et al. | |
| 7,945,292 B2 | 5/2011 | Sweeney et al. | |
| 8,145,277 B2 | 3/2012 | Sweeney et al. | |
| 8,923,804 B1 * | 12/2014 | Aldridge, II | H04W 4/008 455/404.1 |
| 9,219,826 B2 | 12/2015 | Sweeney et al. | |
| 2002/0115478 A1 * | 8/2002 | Fujisawa | H04M 1/6505 455/567 |
| 2004/0209654 A1 | 10/2004 | Cheung et al. | |
| 2004/0222879 A1 | 11/2004 | Sawyer et al. | |
| 2004/0224670 A1 | 11/2004 | Hull et al. | |
| 2005/0090234 A1 | 4/2005 | Ioku et al. | |
| 2005/0143139 A1 | 6/2005 | Park et al. | |
| 2005/0172154 A1 | 8/2005 | Short et al. | |
| 2005/0221792 A1 | 10/2005 | Mattisson | |
| 2005/0233774 A1 * | 10/2005 | Ladouceur | H04M 19/04 455/567 |
| 2005/0258938 A1 * | 11/2005 | Moulson | H04M 1/575 340/7.58 |
| 2005/0266891 A1 * | 12/2005 | Mullen | H04M 1/72527 455/567 |
| 2005/0272408 A1 * | 12/2005 | Wilkes-Gibbs | H04M 19/04 455/412.2 |
| 2005/0288067 A1 * | 12/2005 | Wainwright | H04M 19/04 455/567 |
| 2006/0003700 A1 | 1/2006 | Yasuda et al. | |
| 2006/0094474 A1 | 5/2006 | Zatloukal et al. | |
| 2006/0240877 A1 | 10/2006 | Filiba et al. | |
| 2006/0258406 A1 | 11/2006 | Igarashi et al. | |
| 2007/0041582 A1 | 2/2007 | Lam | |
| 2007/0049197 A1 | 3/2007 | Klein | |
| 2007/0135087 A1 | 6/2007 | Villevieille et al. | |
| 2007/0142024 A1 * | 6/2007 | Clayton | H04H 20/08 455/403 |
| 2007/0173232 A1 * | 7/2007 | Kuo | H04M 1/72527 455/412.2 |
| 2007/0265038 A1 * | 11/2007 | Kim | H04M 1/7253 455/567 |
| 2008/0113689 A1 | 5/2008 | Bailey | |
| 2008/0167092 A1 | 7/2008 | Ueda et al. | |
| 2008/0171536 A1 | 7/2008 | Katz | |
| 2008/0186960 A1 | 8/2008 | Kocheisen et al. | |
| 2008/0250319 A1 | 10/2008 | Lee et al. | |
| 2008/0261529 A1 * | 10/2008 | Rosenblatt | H04W 48/18 455/41.3 |
| 2008/0293453 A1 * | 11/2008 | Atlas | G08B 6/00 455/567 |
| 2008/0300024 A1 | 12/2008 | Sweeney et al. | |
| 2009/0059907 A1 | 3/2009 | Sindhwani et al. | |
| 2009/0181726 A1 * | 7/2009 | Vargas | H04M 1/72533 455/567 |
| 2011/0059769 A1 * | 3/2011 | Brunolli | G08C 17/02 455/556.1 |
| 2011/0230239 A1 | 9/2011 | Ueda et al. | |
| 2011/0254684 A1 * | 10/2011 | Antoci | H04M 1/7253 340/539.13 |
| 2011/0300804 A1 * | 12/2011 | Lu | H04B 10/1141 455/41.3 |
| 2012/0052808 A1 * | 3/2012 | McMeans | H04B 17/23 455/41.3 |
| 2012/0108215 A1 * | 5/2012 | Kameli | H04M 1/0256 455/412.2 |
| 2012/0238330 A1 * | 9/2012 | Wu | H04M 1/7253 455/569.1 |

OTHER PUBLICATIONS

U.S. Appl. No. 13/421,664; Final Office Action dated Jul. 12, 2012; 10 pages.
U.S. Appl. No. 13/421,664; NonFinal Office Action dated Oct. 2, 2012; 10 pages.
U.S. Appl. No. 13/421,664; NonFinal Office Action dated Feb. 13, 2013; 8 pages.
U.S. Appl. No. 13/421,664; Final Office Action dated Jul. 2, 2013; 12 pages.
U.S. Appl. No. 13/421,664; NonFinal Office Action dated Oct. 18, 2013; 9 pages.
U.S. Appl. No. 13/421,664; NonFinal Office Action dated Apr. 9, 2014; 10 pages.
U.S. Appl. No. 13/421,664; Final Office Action dated Sep. 29, 2014; 11 pages.
U.S. Appl. No. 13/421,664; NonFinal Office Action dated Apr. 16, 2015; 11 pages.
U.S. Appl. No. 13/421,664; Notice of Allowance dated Aug. 14, 2015; 15 pages.
Ray, Bill; The Register; located at http://www.theregister.co.uk/2007/05/07/how_do_you_carry_phone/print.html; May 8, 2007; 2 pages.
Chen, Jason; "Hands-On With BlueQ Bluetooth They Work as Advertised"; About Gismodo; located at http://gizmodo.com/gadgets/review/hands+on-with-blueq-bluetooth-wristbands-verdict-the; May 21, 2007; 9 pages.

\* cited by examiner

WIRELESS RINGER

CROSS REFERENCE TO RELATED APPLICATIONS

This application is a continuation of U.S. patent application Ser. No. 13/421,664, filed Mar. 15, 2012 by Sweeney et al. and titled, "System and Method for a Wireless Ringer Function, which is a Continuation Application of U.S. patent application Ser. No. 11/906,100 (now U.S. Pat. No. 8,145,277) filed Sep. 28, 2007; entitled SYSTEM AND METHOD FOR A WIRELESS RINGER FUNCTION, both of which are hereby incorporated by reference in its entirety.

BACKGROUND

The use of wireless devices has grown nearly exponentially in recent years. The growth is fueled by improved technologies and wireless communication protocols. Despite the advancement in technology, some communication problems still remain and other new problems have been created.

In many cases, wireless devices, such as cell phones, personal digital assistants (PDA), and Blackberry® devices, are quite small. These wireless devices may be very expensive and store large quantities of important information. As a result, the wireless device is frequently stowed in a pocket, backpack, purse, luggage, or other bags or personal belonging carriers. In other situations, the clothing or accessories of the wireless user may not accommodate carrying the wireless device on a clip or in a pocket. Consequently, many times the wireless user may be unable to determine when a message is being received by the wireless device. This may occur because of the location or distance between the wireless user and the wireless device. For example, if the user is in an airport, the user may not be able to hear a cell phone ringing when it is stowed in the user's luggage. In another example, a majority of women like to keep cell phones in handbags or purses despite the fact that they miss calls approximately fifty percent of the time.

Additionally, the audio, visual, and tactile systems used by the wireless device to alert the user of incoming calls, text messages, or emails are quite limited resulting in many missed calls and communication frustration. For example, the user may have set the device to vibrate only and may not feel the vibrations even within a carrier, such as a purse. In any case, a user may be reluctant to place a wireless device in a more secure location for fear that incoming communications may be missed. The user may also feel the need to leave a carrier, such as a purse, open to be able to hear the wireless device, thereby exposing the wireless device and other personal items to theft, inadvertent loss, or exposure to the elements.

SUMMARY

To provide a way of alerting a user of incoming communication from a wireless device, a system and method for a remote wireless ringer may be used. One embodiment of a method for extending alerts for a wireless device includes linking the wireless device through a wireless connection with a wireless ringer module; wherein the wireless ringer module is removably coupled to a device having an interface for receiving and coupling with the wireless ringer module. The method further includes transmitting a signal to the wireless ringer that triggers an alert feature of the wireless ringer for notifying a user of an incoming communication in response to the wireless device receiving an indication of an incoming communication.

Another embodiment provides a method for extending alerts for a wireless device that includes linking the wireless device through a wireless connection with a wireless ringer module; wherein the wireless ringer module is removably coupled to a device having an interface for receiving and coupling with the wireless ringer module. The method also includes transmitting a signal to the wireless ringer that triggers an alert feature of the wireless ringer for notifying a user of an incoming communication in response to the wireless device receiving an indication of an incoming communication.

Yet another embodiment includes a device for extending alerts for a wireless device. The device includes a physical interface for receiving and coupling with a removable wireless ringer module, the physical interface has a width and height opening at least as large as the removable wireless ringer module for receiving the removable wireless ringer module. The device further includes a processor configured to execute instructions to link the removable wireless ringer module with a communication device; and trigger an alert feature on the media player for notifying a user of the incoming communication in response to the removable wireless ringer module receiving an indication of an incoming communication to the communication device.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

An illustrative embodiment of the present invention provides a system and method for a remote wireless ringer. The remote wireless ringer may be used to alert a user that an incoming communication is being received by a wireless device. In particular, the wireless ringer may indicate that a call, text message, email, or other communication is being received by the wireless device. The illustrative embodiments are particularly useful for a user that may have the wireless device stored in a purse, briefcase, or luggage so that the user is unable to hear, feel, or otherwise sense the ringing mechanism of the wireless device.

The wireless ringer and wireless device communicate using a wireless connection. The user may position the wireless ringer so that the user may be informed that the wireless device is ringing even when the wireless device is stored or otherwise secured. In one embodiment, the wireless ringer includes a speaker for outputting an alert indicating that the wireless device is receiving an incoming communication. Alternatively, the wireless ringer may include a light-emitting diode (LED), vibrator, or text display for indicating that communication is being received by the wireless device. The user may set and store preferences for receiving the alert. The wireless ringer may also play an alarm or alert the user when the wireless connection between the wireless devices is severed because of distance limitations, battery power, or other interference.

In one embodiment, the remote wireless ringer may be a decorative attachment for a purse or belt. The remote wireless ringer may also be integrated with a music player, ear buds, headset or other electronic devices. For example, the remote wireless ringer may be a card that is inserted into an mp3 player when the user is listening to music and may be unable to hear an incoming call on a cell phone. In another embodiment, the remote wireless ringer may be embedded, integrated, connected, or otherwise attached to jewelry or personal items, such as a ring, glasses, necklace, earrings, bracelet, wallet, or other personal accessories or effects. The different embodiments of the remote wireless ringer allow a user to select a remote notification device most appropriate for their lifestyle.

Figure 1:
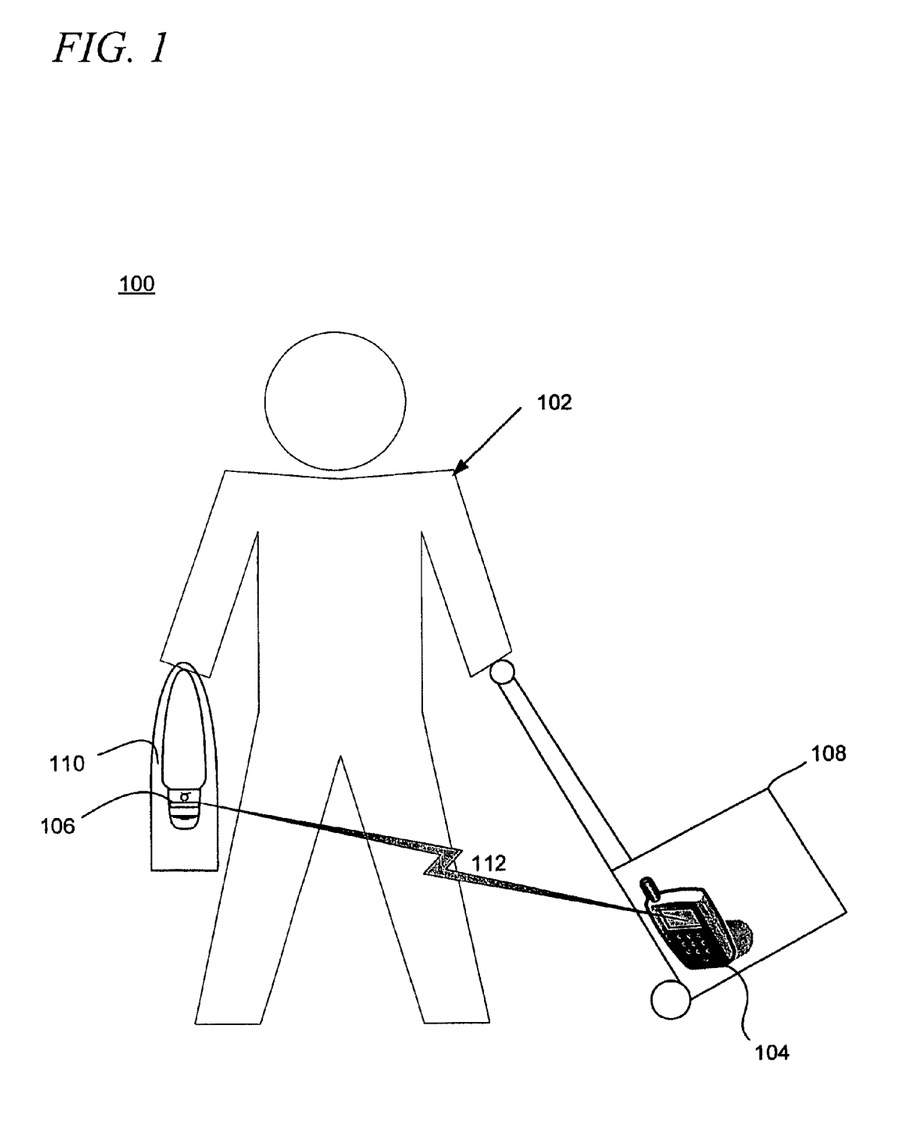
FIG. 1 is an illustrative diagram of a wireless ringer environment in accordance with an illustrative embodiment.

FIG. 1 is an illustrative diagram of a wireless ringer environment in accordance with an illustrative embodiment. The wireless ringer environment 100 may include numerous elements including a user 102, a wireless device 104, a wireless ringer 106, and carriers 108 and 110. In one embodiment, the user 102 has secured the wireless device 104 in the carrier 108 in order to ensure the wireless device is not stolen or inadvertently lost.

The carrier 108 may be any storage device used to store and carry personal belongings. For example, the carrier 108 may be a briefcase, luggage, attaché, purse, laptop bag, or other carrier. The carrier 110 may also be any type of carrier suitable for storing and carrying items including belongings of the user. The wireless device 104 may be stored in either carrier 108 or 110. In particular, many female users of the wireless device 104 may securely place the wireless device 104 in a purse.

The wireless ringer 106 may be a remote ringer device used to indicate that a communication is incoming to the wireless device 104. In one embodiment, the wireless device 104 and wireless ringer 106 communicate through a wireless connection 112. The wireless connection 112 may be a communication link or session suitable for communicating control signals, exchanging data, or conveying commands between the wireless device 104 and wireless ringer 106. The wireless connection may be established in any number of ways as described in FIGS. 9 and 10.

In one embodiment, the wireless connection 112 is a Bluetooth® or WiFi® connection. However, the wireless connection 112 may be any low-power radio signal suitable for wirelessly linking devices wirelessly for communication without requiring excessive power from the wireless ringer 106 and wireless device 104. The wireless connection 112 may be established automatically or be based on user input and programming. As shown, when the wireless device 104 is stored in the carrier 108, the user 102 may be unable to hear a ring tone or other alert played or otherwise implemented by the wireless device 104 intended to inform the user 102 that a call or other communication is incoming.

In one embodiment, the wireless device 104 may be a cellular phone. However, the wireless device 104 may be a mobile phone, personal digital assistant, personal computer, pager, Blackberry®, or other data or voice communication device suitable for wireless communication. The wireless device 104 may incorporate various hardware, firmware, or software for enabling communication and functionality between the wireless device 104 and the wireless ringer 106. In another embodiment, the wireless device 104 may include the hardware and software of the wireless ringer 106 for enabling communication and the features and methods herein described.

In one embodiment, the wireless device 104 may include logic for specifying how and when the user prefers to use the wireless ringer 106. Additionally, the wireless device may include a specialized transceiver for sending and receiving data and other information through the wireless connection 112. The wireless device 104 may also include a specialized instruction set or program that may be executed to operate or communicate with the wireless ringer 106.

A separation or proximity alarm may play or be activated for both the wireless device 104 and the wireless ringer 106 when separated by a threshold distance. The preferences for the wireless ringer 106 may be set using a user interface of the wireless device 104 and then transmitted to the wireless ringer 106 for implementation. For example, the user 102 may program the functionality of the wireless ringer 106 using a software interface that is stored and executed by the wireless device 104. Once the programming or user preferences are set, the code or instructions for operation of the wireless ringer 106 may be sent to the wireless ringer 106 by a synchronization module of the wireless device 104. The synchronization module may work in conjunction with the wireless connection 112 to synchronize data, instructions, applications, communications protocols, ring tones, or other information between the two devices.

Software updates and configurations may be downloaded to the wireless device 104 and then synchronized with the wireless ringer 106 based on the synchronization module. Alternatively, the updates and preferences may be downloaded directly to the wireless ringer 106 or synchronized using a wireless or hardware interface of the wireless ringer 106 for wirelessly receiving data from a personal computer, wireless network, or other computing device or through a port of the wireless ringer 106.

Figure 2:
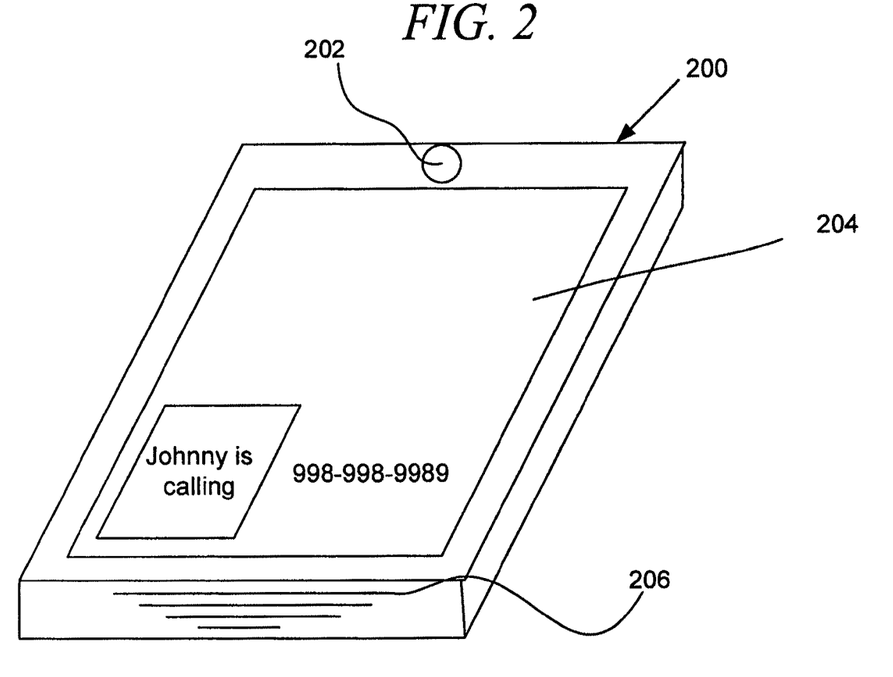
FIG. 2 is a perspective diagram of a media player with an integrated wireless ringer in accordance with an illustrative embodiment.

The user 102 may position the wireless ringer 106 so that even if the user is unable to hear or receive a communication alert from the wireless device 104, the user may be able to hear, sense, or feel an alert from the wireless ringer 106 indicating that communication is incoming to the wireless device 104 as described in FIG. 2. The wireless ringer 106 may be or include a clip, strap, pin, magnet, suction cup, implant, sunglasses, belt buckle, article of clothing, arm band, jewelry, eyeglass attachment, hat, adhesive device, device that sits inside the outer ear, Velcro, or other mechanism for fastening the wireless ringer 106 to a carrier 110 or to the user's person or clothing. The user's person as used herein refers to the body of the user, personal belongings or accessories and the user's clothing.

As shown, the carrier 110 may be a purse and the wireless ringer 106 may take the shape and/or appearance of an adornment, decoration, or accessory to the carrier 110. For example, the wireless ringer 106 may be a gem-embedded decoration in the form of a star. The wireless ringer 106 may appear to be integrated with the decorations or functions of the purse or may be appear to be an add-on. In another embodiment, the wireless ringer 106 may have an exterior shape in the form of a coin or token to be carried in the pocket of the user 102.

The user 102 may also establish an alert used by the wireless ringer 106 to indicate that a call is incoming to the wireless device 104. In one embodiment, the wireless ringer 106 and the wireless device 104 may synchronize a specified alert as selected by the user 102 using the wireless device 104 through the wireless connection 112. For example, the user 102 may have established a default ring tone for the wireless device 104 which may also be used by the wireless ringer 106 to indicate that a call or other communication is incoming.

The wireless ringer 106 may use any number of default alerts or may download or retrieve alerts from the wireless device 104 for uniformity and easy recognition of incoming communications. As a result, the wireless ringer 106 may play a different alert based on the type of communication that is being received by the wireless device 104. For example, the user 102 may have specified that the wireless device 104 plays a custom ring tone for incoming voice calls, a simple beep for text messages, a series of beeps and a flashing LED for text messages, and tone and vibration for email messages. The alerts played by the wireless device 104 may be similarly played by the wireless ringer 106 so that the user 102 may efficiently determine the type of communication that is incoming in order to determine whether to remove the wireless device 104 from the carrier 108 or to wait until later to access the wireless device 104 to retrieve or answer the incoming communication.

The user 102 may also specify any number of alerts that are used to indicate communication is incoming to the wireless device 104. For example, the wireless ringer 106 may be programmed or set to play a single ring tone for all incoming messages. Alternatively, the wireless ringer may use different types of alerts for the different types of communications. For example, when an incoming voice call is received by the wireless device 104, the wireless ringer may flash the number of the calling party and play a custom ring tone linked with the calling party. Similarly, the wireless ringer 106 may be set to vibrate and flash a light-emitting diode (LED), administer a minor electrical shock, display text, project a message, or activate a perimeter light to alert the user 102 of an incoming email or text message.

The wireless ringer 106 may also play a separation alarm or alert to the user 102 when the wireless connection 112 with the wireless device 104 is severed because of distance limitations, battery power, or other interference. The separation alarm indicates that the wireless ringer 106 is not within a specified distance threshold of the wireless device 104. For example, if the wireless ringer 106 is separated from the wireless device 104 by a distance of more than thirty feet, the wireless ringer 106 and/or the wireless device 104 may play the separation alarm.

The separation alarm may be used for security purposes to help the user know the position or location of the wireless device 104 at all times. The separation alarm may indicate to the user 102 that a laptop bag with important data used to store the wireless device 104 is no longer within a threshold distance of the wireless ringer 106. As a result, the wireless ringer 106 may operate as a security mechanism for the wireless device 104 and the corresponding carrier 108. For example, a user that accidentally forgets the wireless device 104 or the carrier 108 while going through security in an airport may be alerted that the wireless device 104 may be lost or stolen.

The separation alarm may be set to incrementally become more active or use different alert mechanisms of the wireless ringer 106 based on distance. For example, the separation alarm may begin subtly by flashing an LED when separated by ten feet and may play a piercing alarm when the distance exceeds forty feet or if the wireless connection 112 is severed. The user 102 may establish one or more alarms and associated threshold distances to guide the user back to a lost wireless device 104 based on a scaled alert system those changes in frequency, intensity, or tone. In one embodiment, the wireless ringer 106 may provide directional information for locating the wireless device 104, such as distance and direction based on the signal strength and other signal information. The wireless ringer 106 may play, display, or otherwise activate the separation alarm through a device to which the wireless ringer 106 is attached, inserted, embedded, or connected. For example, if the wireless ringer 106 is inserted into a pair of headphones, the separation alert may be played through the headphones when the wireless ringer 106 and wireless device 104 are separated.

FIG. 2 is a perspective diagram of a media player with an integrated wireless ringer in accordance with an illustrative embodiment. The media player is a device for playing and/or displaying media content. The media player may be a video, DVD, mp3 player, or other similar electronic device. For purposes of illustration, the media player is referred as the music player 200. The music player 200 of FIG. 2 is a music player connected to or integrated with a wireless ringer or wireless ringer functionality similar to the wireless ringer 106 of FIG. 1. The music player 200 may include various elements including an LED 202, a touch screen 204, and a speaker 206.

In one embodiment, the music player 200 may be an mp3 player. However, the music player 200 may be any device suitable for playing music and storing files and information. The songs, data, files, information, operating system, and other electronic data of the music player 200 may be stored internally, received through a wired or wireless network, or read from a disk, card, or other hardware storage medium that may be inserted or linked with the music player 200.

In one embodiment, the LED 202, touch screen 204 and speaker 206 may be used individually or in combination to alert a wireless user, such as user 102 of FIG. 1, that communication is being received by a wireless device, such as wireless device 104 of FIG. 1. The LED 202 may flash or light up when a call, text message, chat, or email is incoming. In one embodiment, the touch screen 204 may display the name, associated picture, and number of a calling party. However, the touch screen 204 may display caller identification information or other text suitable to indicate that communication is being received and may inform the user of the identity of the calling party. The touch screen 204 may also flash or change colors indicating communications are incoming to the wireless device.

The touch screen 204 may be configured to receive user input and display information and prompts to the user for the operation of the music player 200. In particular, the touch screen 204 may display the name or identification of a person sending a chat, text, or email message to the user. The touch screen 204 may further display portions of the text, chat, or email message, such as a subject or text of the message. In yet another embodiment, the user may establish pictures, files, ring tones, alerts, or other information that is to be displayed or played through the speaker 208 or headphones to the user. For example, when a call is being received by a wireless device linked with the music player 200, the music player 200 may continue normal operation while flashing a picture of the person calling and vibrating to indicate a call is incoming.

In one embodiment, the music player 200 may receive an indication of an incoming communication from the wireless device. As described the alert may be played, displayed, or activated in any number of ways. In many cases, the user may be listening to the music player 200 when the indication of an incoming communication is received. As a result, the music player 200 may interrupt the music, video, or media being played or displayed to the user so that alert may be clearly heard or viewed by the user. For example, if the user is watching a music video, the music player 200 may mute the sound of the music video and play the alert through the speaker 206 or through attached headphones. Alternatively, the music player 200 may pause or stop the music video and flash a visual alert that a party is calling as well as playing an audio message that "Johnny is calling". In other words, the music player 200 may cut off the track or media to play and/or display the alert.

In another embodiment, the alert overlay the music or media being played. For example, the alert may be played at an increased volume level above the music from a music video and an alert may be flashed on all or part of the touch screen 204. In another example, the volume of the music player may be reduced so that an alert played at a normal volume may be distinguished by the user. A visual portion of the alert may also be played semi-transparently over the music video so that the alert is distinguishable without completely interrupting the media content. The alert and media playback or display may be audibly or visually mixed for effectively alerting the user of the incoming communication.

The speaker 206 may be an audio playback device that may be used to play a tone, prompt, ring tone, or other audio signal to the user indicating that communication is incoming to the wireless device. The speaker 206 may be used to play an incoming communication alert or a separation alarm in conjunction with the other notification mechanisms of the music player 200. The music player 200 may allow the user to set a volume for the speaker 206 based on the user's needs or preferences. For example, the volume may dynamically increase or decrease the longer the alerts are sent to the music player 200. As previously described, the music player 200 may include a jack or port for headphones, ear buds, or other devices suitable for playing music to the user.

The music player 200 may include a strap, clip, or other attachment for securing the music player 200 to the user's person. The different elements of the music player 200 may be used to customize how and when the user receives an alert regarding communication incoming to the wireless device. The music player 200 is particularly suited to the purpose of alerting the user because many users utilize music players very frequently or have them in close proximity at any given time. The music player 200 may include a port or connections for connecting with a docking station in a home or vehicle. Alerts played by the music player 200 may be communicated through speakers, a television, stereo, global positioning system, entertainment center, or other similar device when the music player 200 is docked. For example, when the music player 200 is docked within a vehicle and determines a call is incoming to the wireless device, the music player 200 may show a name and picture of the person calling and play a message through a heads-up display and the speaker system of the vehicle.

Figure 3:
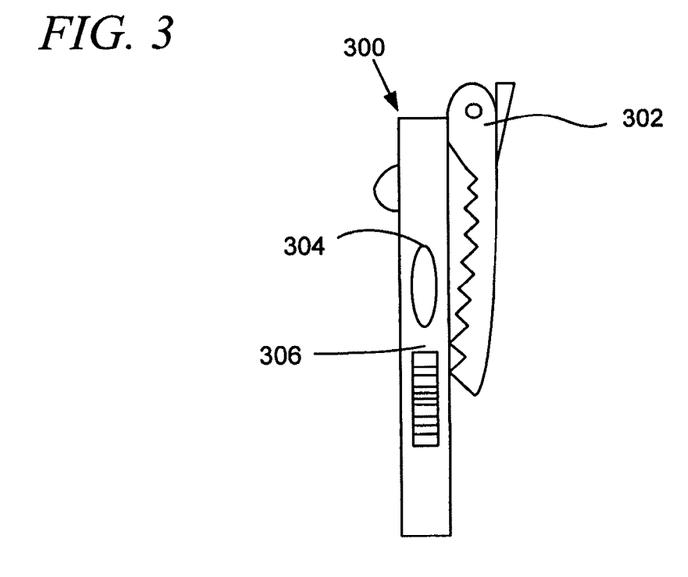
FIG. 3 is a side view of a music player in accordance with an illustrative embodiment of the present invention.

FIG. 3 is a side view of a music player in accordance with an illustrative embodiment. The music player 300 may include the elements of the music player 200 of FIG. 2. In addition, the music player 300 may further include a clip 302, a button 304, and a dial 306.

The clip 302 may be a hinged or stationary mechanism for securing the music player 300 to the user's clothing, wireless ringer cradle, or a personal carrier. As a result, the user may use the clip 302 to secure or unsecure the music player 300 in order to ensure that the user may be alerted of incoming communications to the wireless device. For example, the clip 302 may be used to easily move the music player 300 from a strap of a carrier to a lapel or pocket of a shirt or blouse. The clip 302 allows the music player 300 to be dynamically positioned as needed.

The button 304 and the dial 306 may be used to provide user input and set user preferences and alerts for the music player 300. In one embodiment, the dial 306 may be used to adjust the volume of the wireless ringer. In another embodiment, the button 304 may be used to send a control signal to the wireless device to place an incoming call on hold or to send a default text message to the calling or messaging party. The button 304 and dial 306 may be used to receive numerous types of user input from the user based on changing circumstances and needs of the user with respect to the music player 300. In particular, the button 304 and dial 306 may be used to activate, control, engage, or use the features of the wireless device.

Figure 4:
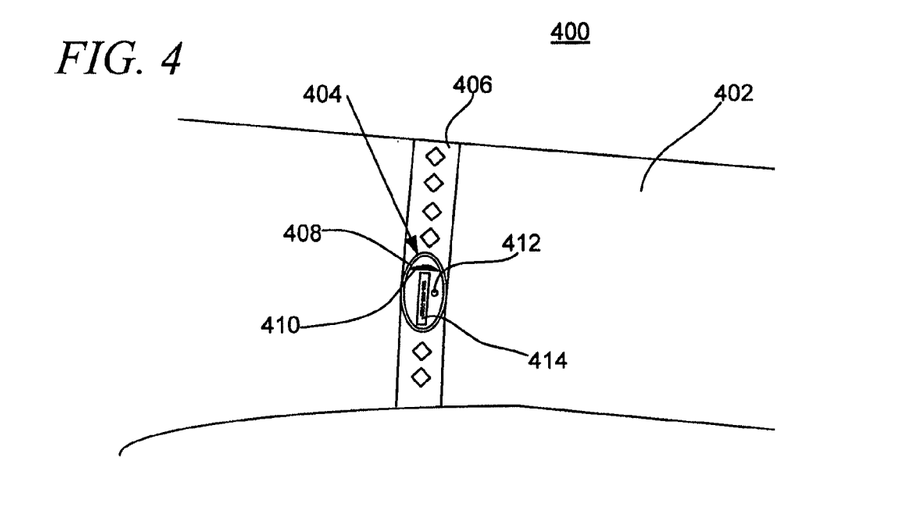
FIG. 4 is a perspective diagram of a bracelet embedded with a wireless ringer in accordance with an illustrative embodiment.

FIG. 4 is a perspective diagram of a bracelet embedded with a wireless ringer in accordance with an illustrative embodiment. The wireless ringer environment 400 of FIG. 4 may include a wrist 402, a wireless ringer 404, a bracelet 406, a perimeter light 408, a speaker 410, a light-emitting diode 412, and a text display 414. The wireless ringer 404 is a particular implementation of the wireless ringer 106 of FIG. 1.

In one embodiment, the wireless ringer 404 may integrated with the bracelet 406 in order to allow the user to wear the wireless ringer 404 as a form of jewelry. The bracelet 406 provides the user the flexibility to physically wear the wireless ringer 404 on the wrist 402 or ankle in order to alert the user when communications are incoming to a wireless device.

The wireless ringer 404 and the bracelet 406 may be fashionably designed so that the user feels comfortable wearing the wireless ringer 404 as a fashion accessory or as part of the user's apparel. As a result, the wireless ringer 404 may be positioned so that the alert may be easily detected by the user. For example, when the wireless ringer 404 is worn on the wrist 402, a vibration alert may promptly alert the user that a mobile call is incoming to a cell phone. Alternatively, the speaker 410, light-emitting diode 412, and text display 414 may use multiple efforts or types of alerts to inform the user of incoming communications.

The wireless ringer 404 may include the perimeter light 408. The perimeter light 408 may light up as well when communications are incoming. In one embodiment, the perimeter light 408 may allow the alert to be more easily seen by the user. In another embodiment, the wireless ringer 404 may have an internal light and may be housed in a clear or translucent case for allowing the entire wireless ringer 404 to light up when communication is incoming. Alternatively, the LED 412 and text display 414 may flash or light up with any number of lights or color schemes. For example, different colors may be used to indicate the type of communication being received by the wireless device.

In another embodiment, the wireless ringer 404 may be snapped into, attached, or otherwise mountable and removable from the bracelet 406. The wireless ringer 404 and/or the bracelet 406 may include a securing mechanism, such as a magnet, clip, sliding mount, or attachment tabs for attaching or inserting the wireless ringer 404 in the bracelet. The bracelet 406 may be configured for use with or without the wireless ringer 404. In other words, the appearance and design of the bracelet will be functional and aesthetically pleasing regardless of whether the wireless ringer 404 has been attached or connected. In one example, the user may be going to a party and will be stowing her cellular telephone in her purse even though she expects an important phone call. As a result, the user may snap the wireless ringer 404 into the bracelet in order to receive an alert through the speaker 410, text display 414, or a vibrator of the wireless ringer 404. The bracelet 406 may include a gem, decoration, or other feature that may be snapped into the port, receptacle, mount, or position intended for the wireless ringer 404 when the wireless ringer 404 is not attached.

Figure 5:
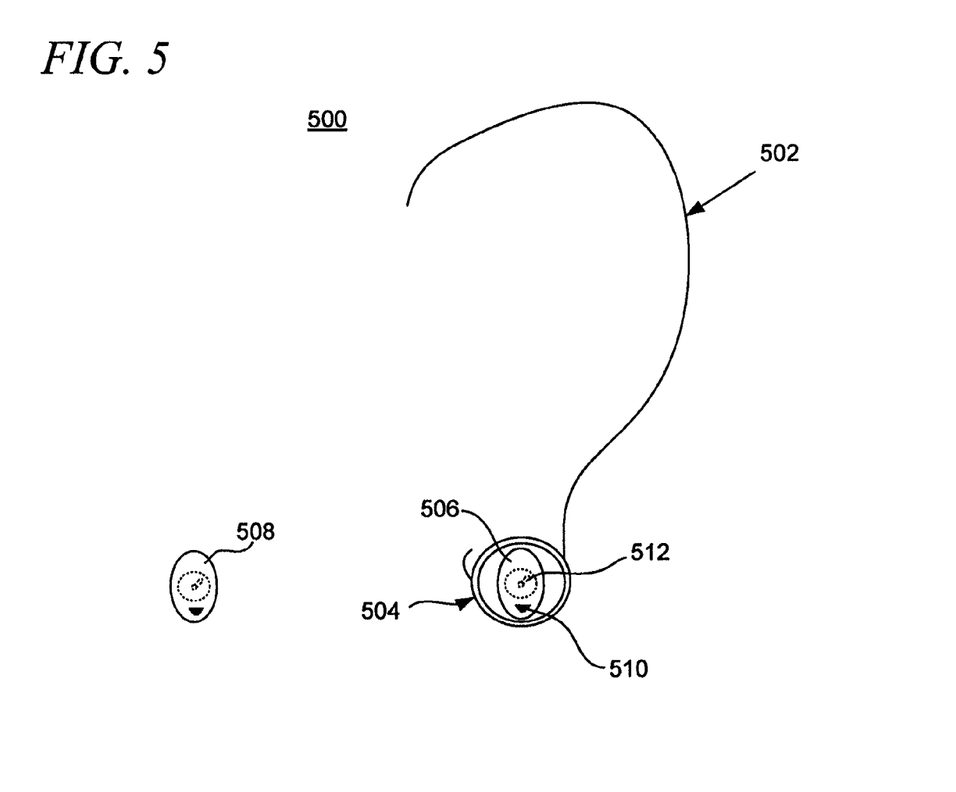
FIG. 5 is a perspective diagram of an earring embedded with a wireless ringer in accordance with an illustrative embodiment.

FIG. 5 is a perspective diagram of an earring embedded with a wireless ringer in accordance with an illustrative embodiment. The wireless ringer environment 500 of FIG. 5 may include an ear 502, an earring 504, wireless ringers 506 and 508, a speaker 510, and a vibrator 512. As shown, the wireless ringer 506 may be attached to the earring 504. The wireless ringer 508 has not been attached to an earring. In one embodiment, the user may attach the wireless ringer 506 to the earring 504. The user may attach the wireless ringer 508 or a dummy wireless ringer in the other ear so that the earrings match. Wireless ringers may be used in sets of one or more based on the need and potential usage. For example, the wireless ringer 508 may be attached to another earring, to a ring, watch, necklace, or the bracelet 406 of FIG. 4.

The wireless ringers 506 and 508 may be configured so that they appear to be only ornamental or decorative in design. In other words, the functionality of the wireless ringers 506 and 508 may be hidden. The wireless ringer 506 may include the speaker 510 and the vibrator 512 for discretely advising the user of an incoming call. The speaker 510 may be positioned to play an alert that may be heard only by the ear 502 of the user. Additionally, only the user may be able to sense when the vibrator 512 is activated indicating the wireless device has an incoming communication. The wireless ringers may be alternatively mounted within or attached to other personal accessories including, but not limited to, a wallet, ring, necklace, coin, key chain, name tag, hair clip, cuff links, tie tack, pendant, pen, buttons, and other similar personal effects. The wireless ringers 506 and 508 may have different color schemes and configurations for matching the clothing, personality, and intended purpose of the wireless ringers 506 and 508. The wireless ringers 506 and 508 may include a battery, capacitor, piezoelectric generator, or other device suitable for providing the power necessary to power the wireless ringers 506 and 508. The wireless ringers 506 and 508 may be charged or have a battery replaced while they are connected to a pair of earrings or may need to be removed to be charged.

Figure 6:
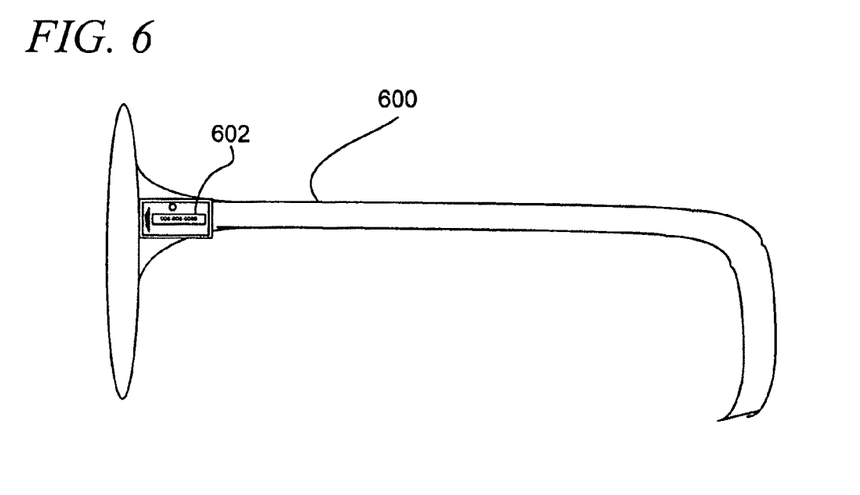
FIG. 6 is a perspective diagram of a pair of glasses embedded with a wireless ringer in accordance with an illustrative embodiment.

FIG. 6 is a perspective diagram of a pair of glasses embedded with a wireless ringer in accordance with an illustrative embodiment. The glasses 600 of FIG. 6 may include a wireless ringer 602. As used herein, the glasses 600 may be prescription glasses, reading glasses, sunglasses, safety goggles, a visor, a helmet, or other similar eye enhancement or protection device.

As previously described, the wireless ringer 602 may be an integrated or built-in portion of the glasses. Alternatively, the user may attach or insert the wireless ringer 602 to each pair of glasses as needed. The wireless ringer 602 may notify the user of communications as described in FIG. 5. In addition, the remote wireless ringer 602 may use a visual cue or display that is directed toward one or more eyes of the user. The visual alert or message may be visible in the corner of the user's eye, pointed directly at the user's eye, or reflected off a lens or surface to be seen by the user. For example, the wireless ringer 602 may reflect a light message, picture, or particular color of lenses of the glasses 600 to indicate who is calling the user's wireless device. In one embodiment, the glasses 600 may be configured to reflect the light or may include specialized lenses to display or reflect a message displayed by the wireless ringer 602.

Figure 7:
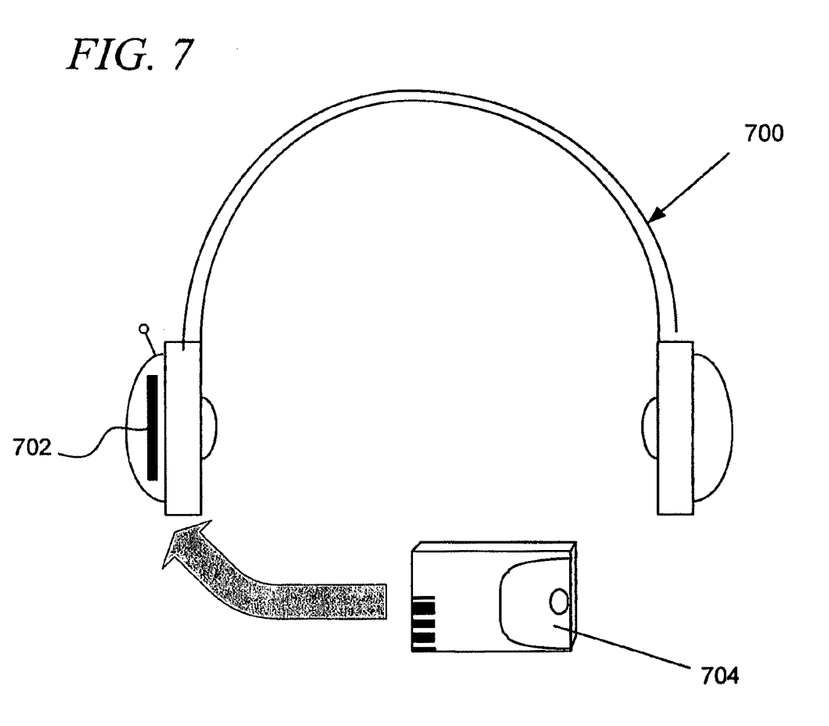
FIG. 7 is a perspective diagram of a headset and wireless ringer card in accordance with an illustrative embodiment.

FIG. 7 is a perspective diagram of a headset and wireless ringer card in accordance with an illustrative embodiment. The headset 700 of FIG. 7 may include a wireless ringer port 702 and a wireless ringer 704. In one embodiment, the wireless ringer 704 may be a card, adapter, or other unit that may be inserted into another electronic device, such as the headset 700.

The headset 700 includes the wireless ringer port 702 as a receptacle for the wireless ringer 704. The wireless ringer port 702 is configured to receive the wireless ringer 704 and integrate its functionality with that of the headset 700. In one embodiment, the headset 700 may power the wireless ringer 704. In another embodiment, the wireless ringer 704 may be a self-contained and operating unit.

The wireless ringer 704 may include contacts, communication ports, docking elements, or other communications and integration mechanisms for communicating information, messages, or alerts to the headset 700. For example, once the wireless ringer 704 is inserted in the wireless ringer port 702 of the headset 700, an incoming call alert and incoming text message alert may be played through the speakers of the headset 700 to the user. The wireless ringer 704 may be similarly used with music players, personal digital assistants (PDAs), laptops, handheld gaming and entertainment devices, and other devices suitable for integrating functionality with the wireless ringer 704.

By inserting the wireless ringer 704 into the headset 700, the user may be able to receive alerts even when listening to loud music. The wireless ringer 704 may use any of the methods or systems herein described for extending alerts, alerting the user, and otherwise conveying information about communications with a wireless device.

Figure 8:
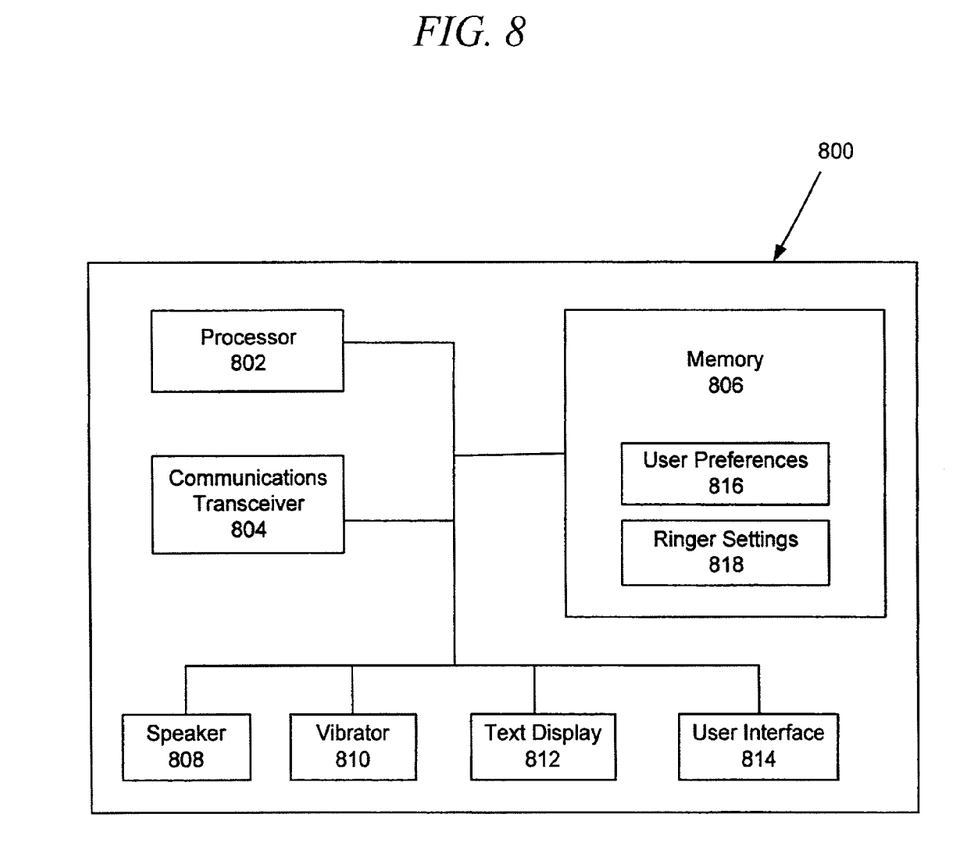
FIG. 8 is a block diagram of a wireless ringer in accordance with an illustrative embodiment.

FIG. 8 is a block diagram of a wireless ringer in accordance with an illustrative embodiment. The wireless ringer 800 is a particular implementation of the wireless ringer 106 of FIG. 1. The wireless ringer 800 may include various internal components which may include a processor 802, communications transceiver 804, memory 806, a speaker 808, a vibrator 810, a text display 812, and a user interface 814. The memory 806 may further include user preferences 816 and ringer settings 818.

The processor 802 may be a processing unit used to process signals received from the wireless device through the communications transceiver 804. The processor 802 may also be logical components for implementing the features of the wireless ringer 800. The processor 802 may control the functionality inter-operation of the various elements of the wireless ringer 800. For example, the processor may execute a set of instructions to implement the features and functionality of the wireless ringer 800. The wireless ringer 800 may include other hardware and software elements used by communication devices and data processing systems not explicitly described herein. The wireless device in communication with the wireless ringer 800 may include added software or hardware for controlling, interfacing, or otherwise additionally communicating with the wireless ringer 800 to perform any number of communication implementations and features.

The communications transceiver 804 may be the transmitter and receiver used to establish the wireless connection between the wireless ringer 800 and the wireless device. For example, the communications transceiver 804 may include an antenna and Bluetooth circuitry for communicating with the wireless device. Alternatively, the communications transceiver 804 may communicate with the wireless device using any number of radio frequencies or wireless control signals for sending data and/or control signals over the wireless connection. The communications transceiver 804 may alert the processor when the wireless connection has been severed or a separation distance exceeded for activating a separation alarm through the different user notification mechanisms of the wireless ringer.

The communications transceiver 804 may also allow the wireless ringer 800 to be integrated with an electronic personal accessory, such as a headset or a music player. The communications transceiver 804 may include the contacts, wiring, software, and other elements that allow the wireless ringer 800 and another electronic device to communicate and/or integrate functionality. In one preferred embodiment, the wireless ringer 800 is an integrated part of a media player, such as an mp3 player, CD player, DVD player, or other media playback device.

The memory 806 may be an electronic storage medium for saving instructions for execution by the processor 802. For example, the instructions stored in the memory 806 may detail logic, programs, or code that dictate the functionality of the wireless ringer 800 and how each of the different components interacts with one another and with the user. The user preferences 816 may establish preferences set by the wireless user for operation of the wireless ringer 800. For example, the user preferences 816 may establish when the threshold distance(s) is used to activate the separation alarm.

Instructions or software within the memory 806 may also detail how the wireless ringer 800 interacts when integrated or connected to another electronic device or personal accessory. In one embodiment, the ringer settings 818 may be configured to vibrate when the wireless ringer 800 is embedded within a bracelet. In another example, the ringer settings 818 and user preferences 816 may be configured to play an alert through the speaker, headphones, and display of an mp3 player when the wireless ringer 800 is inserted as a card in the mp3 player. The user preferences 816 and ringer settings 818 may store additional data and user settings for when the wireless ringer 800 is attached to another device, electronic or otherwise.

The ringer settings 818 may establish how and when the user is alerted of incoming communication received by the wireless device. The ringer settings 818 may include any number of default and custom ring tones, sounds, prompts, chirps, and other audio indicators that may be used as an alert. The ringer settings 818 may also specify a default volume level for the wireless ringer 800. The ringer settings 818 or the user preferences 816 may indicate whether the speaker 808, vibrator 810, or text display 812 is used as an alert to indicate a message incoming to the wireless device. The ringer settings 818 and user preferences 816 may be integrated in the user preferences 816 storing information and preferences regarding the operation and functionality of the wireless ringer 800. For example, the ringer settings 818 may control whether media functions of the media player/wireless ringer 800 are altogether interrupted, mixed, or overlaid to play an alert of incoming communications to a wireless device.

As previously discussed, different forms or types of communication may be associated with the speaker 808, vibrator 810 and text display 812. The ringer settings 818 may also control the default settings for the speaker 808, vibrator 810, and text display 812. For example, the speaker 808 may be set to gradually increase in volume each time the wireless device rings and the wireless ringer 800 is informed of the incoming call through the communications transceiver 804. In another example, the vibrator 810 may vibrate once or in a series to indicate to the user that communication is incoming to the wireless device. The ringer settings 818 may also establish how and what information may be displayed in the text display 812 based on the type of incoming communication to the wireless device, the sending or calling party, and user preferences. The ringer settings 818 and user preferences 816 may be synchronized or downloaded from the wireless device. For example, the ringer settings 818 may ensure that ring tones or other alerts available on the wireless device are downloaded to the memory 806 of the wireless ringer 400.

The user interface 814 may be an implementation of the button 304 and dial 306 of FIG. 3. Alternatively, the user interface 814 may be a touch screen, touch display, scroll wheel, pointer, or other device that allows the user to provide user input. The functionality, instructions, and preferences of the wireless ringer 800 may be input by a user using the user interface 814 or may be received from the wireless device by the communications transceiver 804. The user interface 814 and/or text display 812 may also be able to project text, colors, and images for display to the user. For example, if the wireless ringer 800 is embedded in a pair of glasses, the ringer settings 818 may establish that the text display 812 flashes a message or visual alert that is only discernible to the wearer of the glasses.

The wireless ringer 800 may be shaped or otherwise configured to be embedded, inserted, or connected to another electronic device or personal accessory. As a result, the wireless ringer 800 may be a stand-alone, card, or other device that may be integrated with different devices and accessories as herein described. In one embodiment, the wireless ringer 800 is specially shaped to snap into a piece of jewelry. In another embodiment, the wireless ringer 800 is specially shaped to be slidably mounted or inserted into personal accessories, such as a pair of sunglasses or a music player. The wireless ringer 800 may include a release or locking mechanism for ensuring that the wireless ringer 800 is not accidentally separated from the personal accessory.

Figure 9:
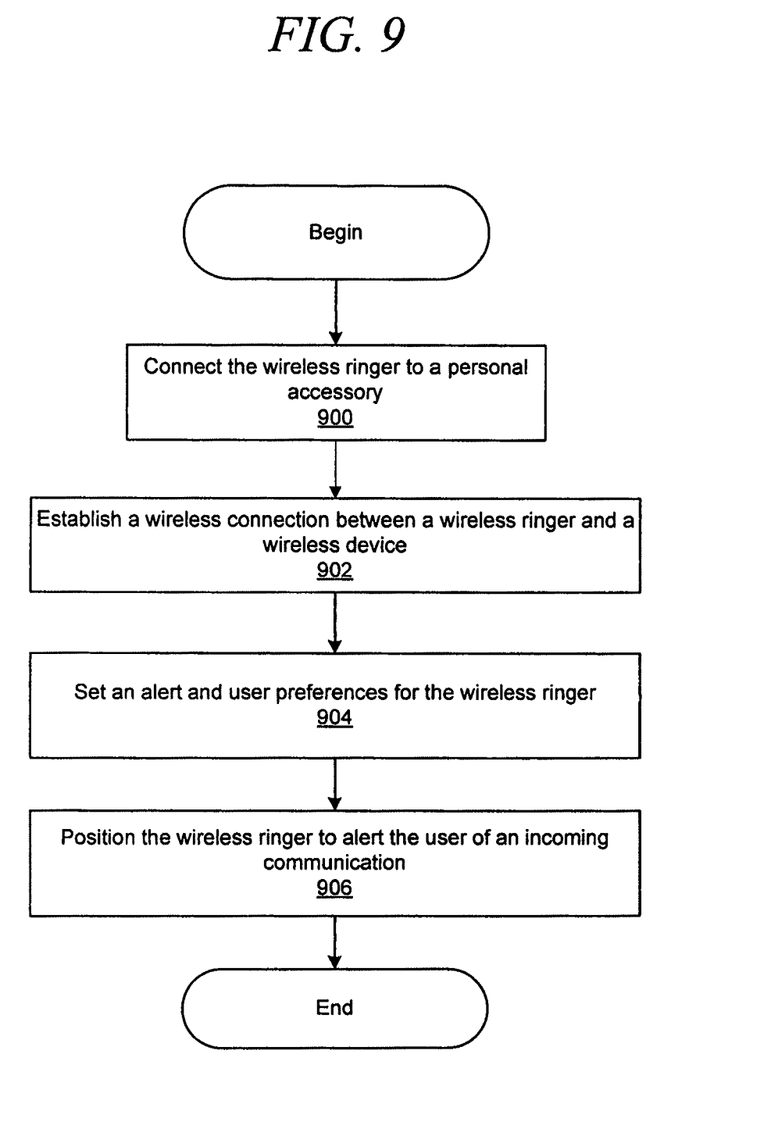
FIG. 9 is a flowchart of a process for using a wireless ringer in accordance with an illustrative embodiment.

FIG. 9 is a flowchart of a process for using a wireless ringer in accordance with an illustrative embodiment. The process of FIG. 9 may be implemented by a user with access to a wireless ringer and a wireless device. The process of FIG. 9 may be initiated to allow the wireless ringer to function with the wireless device to indicate a call or communication is incoming to the wireless device.

The process may begin with the user connecting the wireless ringer to a personal accessory (step 900). The wireless ringer may be inserted, attached, linked, embedded, or otherwise connected to the personal accessory. The personal accessory may take any number of forms as previously described including, but not limited to, music players, glasses, jewelry, or other items used, worn, or carried by a user. By attaching the wireless ringer to the personal accessory, the user may integrate the functionality of the devices. For example, if the personal accessory is an mp3 player, the mp3 player may play alerts through the headphones, light up the display, or perform other wireless ringer functions of the wireless ringer. In another embodiment, the wireless ringer may be hardware or software integrated with a media player. For example, the user may activate a wireless ringer function of an mp3 player to implement the process of FIG. 9.

The wireless ringer may include leads, ports, wires, or other communication means for communicating with electronically equipped personal accessories when connected. The personal accessory or wireless ringer itself may be configured with a latch, tabs, magnet, spring-loaded release button, or other securing mechanism so that the wireless ringer is not accidentally removed or jostled free of the personal accessory. The personal accessory may include a port, receptacle, bay, indentation, or other connection mechanism for receiving the wireless ringer.

Next, the user establishes a wireless connection between the wireless ringer and a wireless device (step 902). The wireless connection may be any type of wireless signal, communication session or link, or protocol for exchanging control signals or data. The wireless connection may be encoded or encrypted to prevent outside parties from knowing communication is incoming to the wireless device. In one example, the link may be a Bluetooth connection. In one embodiment, the user may place the wireless device in a selection or search mode in order to establish the link between the wireless device and wireless ringer. The user may also manually program each device to connect with one another. The wireless device and wireless ringer may also automatically connect with one another once activated. For example, when turned on, the wireless device may be configured to actively search for the wireless ringer. The wireless device may constantly or periodically search for a signal from the wireless ringer. The wireless connection or link ensures that the wireless device may communicate with the wireless ringer for ringing the wireless ringer when a communication is received by the wireless device. In one embodiment, an electronic device in which the wireless ringer is integrated or connected may establish the wireless connection with the wireless device.

Next, the user sets an alert and user preferences for the wireless ringer (step 904). In one embodiment, the wireless ringer may include default settings and user preferences so that step 904 may not be necessary unless selected by a user. For example, the wireless ringer may by default automatically use the ring selected for the wireless device. Alternatively, if the user has selected a custom ring tone, that ring tone may be communicated to the wireless ringer so that when a call is received, the wireless ringer plays the custom ring tone as the alert. In another embodiment, the user may set the wireless ringer to vibrate, light up, or display a text or calling number as the alert. The user preferences and ringer settings may define how and when the alert or separation alarm is played by the wireless ringer, volume, alert settings for each type of communication and other configurations, features, and preferences of the wireless ringer. The wireless ringer may include any number of buttons, scroll wheels, knobs, or other interfaces for receiving the user input that may be required for steps 902 and 904.

Next, the user may position the wireless ringer to alert the user of an incoming communication (step 906) with the process terminating thereafter. The wireless ringer may include a clip, straps, magnet, cradle, or other securing means for attaching the wireless ringer to clothing, purse, bag, or other location in which the user may be able to receive the alert from the wireless ringer. In one embodiment, the wireless ringer may be decorated to appear or integrate as a clothing or fashion accessory. For example, the wireless ringer may be worn as a brooch or a cuff link. The user may secure the wireless device in a purse or bag with the assurance that he/she may still be notified of incoming calls through the wireless ringer. The wireless ringer may be integrated, embedded or connected to a personal accessory such as earrings, necklace, sunglasses, wallet, tie tack, headphones, music player, pendant, or other personal item for subtly indicating that a communication is being received by the wireless device.

Figure 10:
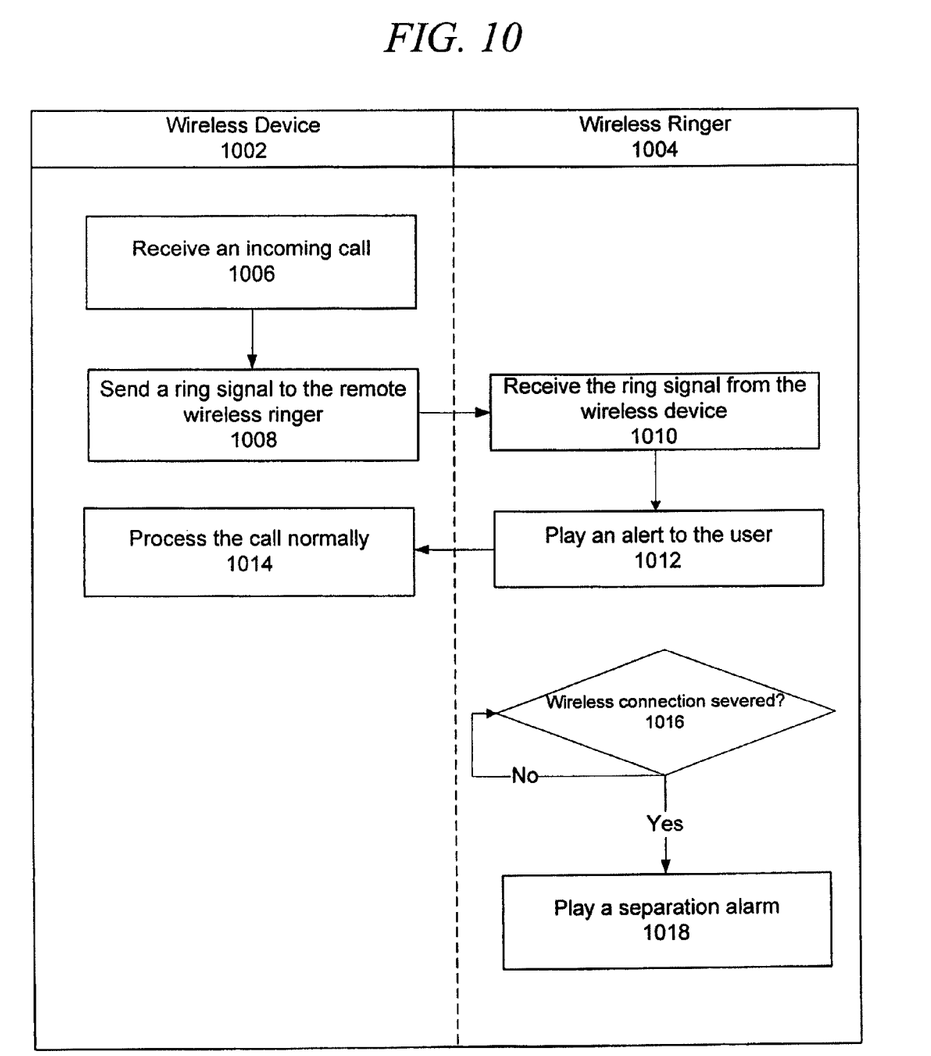
FIG. 10 is a flowchart of a process for implementing communication using a wireless ringer in accordance with an illustrative embodiment.

FIG. 10 is a flowchart of a process for implementing communication using a wireless ringer in accordance with an illustrative embodiment. The process of FIG. 10 may be implemented by a wireless device 1002 and a wireless ringer 1004. The process begins with the wireless device 1002 receiving an incoming call (step 1006). The incoming call of step 1006 may be a voice, text, chat, email, or other message.

Next, the wireless device 1002 sends a ring signal to the wireless ringer (step 1008). The wireless ringer 1004 receives the ring signal from the wireless device (step 1010). The ring signal may be sent and received in steps 1008 and 1010 through a wireless connection or wireless link established between the wireless device 1002 and the wireless ringer 1004. The ring signal in steps 1008 and 1010 may be a control signal indicating that communication is incoming to the wireless device 1002. In one embodiment, the ring signal may not include any data, but rather the ring signal may strictly control the operation of the wireless ringer. In another embodiment, the ring signal may include data regarding the type, sender, or content of the incoming communication that may be displayed or otherwise conveyed through the wireless ringer to the user. The ring signal of step 1010 may also specify an alert that may be used by the wireless ringer 1004 to inform the user of the type of communication being received by the wireless device 1002. For example, if a text message is received, the ring signal may indicate that the wireless ringer 1004 is to beep twice in succession.

In one embodiment, the wireless ringer 1004 may be integrated with a media player. For example, the wireless ringer 1004 may be hardware and software within an mp3 player. Once the ring signal is received in step 1010, user preferences may specify how an alert may be played, displayed, or activated to inform the user that the wireless device 1002 is receiving an incoming communication. In particular, the user may be able to set preferences or criteria for interrupting, mixing, or overlaying media playback. For example, based on caller identification information the wireless ringer 1004 may be set to interrupt the playback of a move or music to play and display an alert to the user through the display, headphones, and/or a speaker. In another example, the wireless ringer 1004 may only overlay the alert or mix the alert with the media content being output to the user so that the user may be alerted to the incoming communication without interrupting the playback of media content.

Next, the wireless ringer 1004 plays an alert to the user (step 1012). In one embodiment, the alert of step 1012 may be a pre-selected ring tone. In another embodiment, the alert may be one or more vibrations implemented by the wireless ringer 1004. In yet another embodiment, the wireless ringer 1004 may flash an LED or other light indicator and a text indicator indicating who and what is being communicated to the wireless device 1002. In one embodiment, the wireless ringer 1004 may be embedded or integrated with another device. As a result, the alert may be played or displayed by the one or more interconnected devices. Alternatively, the user preferences for the type of device may establish how the alert is played to the user in step 1012.

Next, the wireless device 1002 processes the call normally (step 1014). The user may select to retrieve the wireless device to answer the incoming communication or respond to it. Alternatively, the user may ignore the incoming communication to the wireless device 1002. In either case, the call may be processed normally by allowing the user to answer a voice call without interference from the wireless ringer 1004. In the event the user ignores the wireless device 1002, the unanswered call may be processed by voicemail the same as any other unanswered call. Text, chat, and email messages remain new until accessed or viewed by the user on the wireless device 1002. During step 1014, the wireless ringer 1004 with an integrated media player may return to normal functionality after playing the alert in step 1012.

The wireless ringer 1004 independently determines whether the wireless connection is severed (step 1016). The wireless connection or link is the communication session established for exchanging data or control signals between the wireless device 1002 and the wireless ringer 1004. If the wireless connection is not severed in step 1016, the wireless ringer continues to determine whether the wireless connection has been severed (step 1016). As a result, the wireless ringer 1004 is constantly determining the status of the wireless connection while the wireless connection is active.

If the wireless connection has been severed in step 1016, the wireless ringer 1004 plays a separation alarm (step 1018). The separation alarm may alert the user that the wireless connection is severed or that the wireless device 1002 is separated from the wireless ringer 1004 by a threshold distance. The separation alarm may also be a tone, ring, verbal alert, tactile response, flashing light(s), or other suitable means or mechanisms for obtaining the attention of the user and alerting the user that the wireless connection has been severed for whatever reason. The separation alarm may be particularly useful if the wireless device 1002 is stolen or is about to be accidentally lost. In one example, the user may be able to specify how and when the separation, distance, or proximity alarm is activated. This user information may specify how the determination of step 1016 is made.

The illustrative embodiments allow the user to receive notification of incoming communication through a wireless ringer. As a result, a user may feel secure in storing or otherwise securing the wireless device because the user is assured that, regardless of the position or inaccessibility of the wireless device, the user will still be able to be notified that communication is incoming. The wireless ringer may be positioned by the user for maximum effect. Default settings or customized alerts and user preferences may be used to effectively provide the desired alerts.

In another embodiment, the wireless ringer may be configured, set, or used to send a predefined response message to the caller or sender of an incoming communication. For example, when the alert of the wireless ringer is activated, the user may press a button on the wireless ringer to send a response message stating "My phone is out-of-reach so I will call or email you shortly."

The previous detailed description is of a small number of embodiments for implementing the invention and is not intended to be limiting in scope. The following claims set forth a number of the embodiments of the invention disclosed with greater particularity.

What is claimed is:

1. A wireless ringer comprising:
   a communications transceiver providing for direct wireless communication between the wireless ringer and a physically separate wireless device;
   a memory;
   a touch screen user interface providing for a user to input multiple ringer settings to the memory, wherein a first ringer setting of the multiple ringer settings is linked by the user to an identity of a known calling party, the touch screen user interface further providing for a display of text;
   a speaker;
   a vibrator;
   a processor in communication with the communications transceiver, the memory, the touch screen user interface, the speaker and the vibrator, said processor causing one or more of the touch screen user interface, the speaker and the vibrator to emit a first alert according to the first ringer setting and in response to receipt, through the communications transceiver, of a wireless signal from the wireless device indicating that the wireless device has received an incoming communication of a first type from the known calling party, and said processor further causing one or more of the speaker, the touch screen user interface and the vibrator to emit a second alert according to a second ringer setting, which second alert is different from the first alert, in response to receipt of a second wireless signal from the wireless device indicating that the wireless device has received an incoming communication of a second type from a party other than the known calling party,
   wherein the processor is further configured to determine the first alert based on the first ringer setting for communications of the first type from the known calling party, and the second alert based on the second ringer setting for communications of the second type from the party other than the known calling party;
   wherein the processor is further configured to one of interrupt, mix, or overlay playback of media content on at least one of the touch screen user interface or the speaker with the first alert based on the first ringer setting, wherein the first ringer setting indicates whether to interrupt, mix, or overlay the playback of media content with the first alert, based at least in part on caller identification information; and
   a strap providing for attachment of the wireless ringer to the user's wrist.

2. The wireless ringer of claim 1 wherein the processor causes at least two of the touch screen user interface, the speaker and the vibrator to emit alerts according to the first ringer setting and in response to receipt of the wireless signal from the wireless device indicating that the wireless device has received the incoming communication of the first type from the known calling party.

3. The wireless ringer of claim 1 wherein the processor causes each of the touch screen user interface, the speaker and the vibrator to emit alerts according to the first ringer setting and in response to receipt of the wireless signal from the wireless device indicating that the wireless device has received the incoming communication of the first type from the known calling party.

4. The wireless ringer of claim 1 wherein the communications transceiver, processor and memory provide for the second ringer setting to be wirelessly transmitted from the wireless device to the wireless ringer and stored in the memory.

5. A wireless ringer comprising:
a communications transceiver providing for direct wireless communication between the wireless ringer and a physically separate wireless device;
at least one alert output device;
a memory;
a user interface providing for a user to input and store multiple ringer settings in the memory wherein a first ringer setting of the multiple ringer settings is linked by the user to an identity of a known calling party;
a processor in communication with the communications transceiver, the memory, the user interface, and the at least one alert output device, said processor causing the at least one alert output device to emit a first alert according to the first ringer setting and in response to receipt, through the communications transceiver, of a wireless signal from the wireless device indicating that the wireless device has received an incoming communication of a first type from the known calling party, wherein said processor further causes the at least one alert output device to emit a second alert, according to a second ringer setting which second alert is different from the first alert, in response to receipt of a second wireless signal from the wireless device indicating that the wireless device has received an incoming communication of a second type from a party other than the known calling party,
wherein the processor is further configured to determine the first alert based on the first ringer setting for communications of the first type from the known calling party, and the second alert based on the second ringer setting for communications of the second type from the party other than the known calling party;
wherein the processor is further configured to one of interrupt, mix, or overlay playback of media content on the at least one alert output device with the first alert based on the first ringer setting, wherein the first ringer setting indicates whether to interrupt, mix, or overlay the playback of media content with the first alert, based at least in part on caller identification information; and
a strap providing for attachment of the wireless ringer to the user's wrist.

6. The wireless ringer of claim 5 wherein the at least one alert output device comprises a speaker and wherein the first alert comprises an audio indicator emitted by the speaker according to the first ringer setting and in response to the receipt of the wireless signal from the wireless device indicating that the wireless device has received the incoming communication of the first type from the known calling party, wherein the processor is further configured to one of interrupt, mix, or overlay playback of media content on the speaker with the first alert based on the first ringer setting, based at least in part on the caller identification information.

7. The wireless ringer of claim 5 wherein the at least one alert output device comprises a vibrator and wherein the alert comprises vibration of the vibrator according to the first ringer setting and in response to the receipt of the wireless signal from the wireless device indicating that the wireless device has received the incoming communication of the first type from the known calling party.

8. The wireless ringer of claim 5 wherein the at least one alert output device comprises a display of the user interface and wherein the first alert comprises a display of text on the display according to the first ringer setting and in response to receipt of the wireless signal from the wireless device indicating that the wireless device has received the incoming communication of the first type from the known calling party.

9. The wireless ringer of claim 5 wherein the communications transceiver, processor and memory provide for the second ringer setting to be wirelessly transmitted from the wireless device to the wireless ringer and stored in the memory.

10. A method for extending alerts from a wireless device, comprising:
providing a wireless ringer comprising:
a communications transceiver providing for direct wireless communication between the wireless ringer and a physically separate wireless device;
a touch screen user interface providing for a user input and a display of text;
a speaker;
a vibrator;
a memory;
a processor in communication with the communications transceiver, the memory, the touch screen user interface, the speaker and the vibrator; and
a strap providing for attachment of the wireless ringer to the user's wrist;
storing multiple ringer settings in the memory using the touch screen user interface wherein a first ringer setting of the multiple ringer settings is linked by the user to an identity of a known calling party;
receiving, with the communications transceiver, a first wireless signal from the physically separate wireless device indicating that the wireless device has received an incoming communication from the known calling party;
receiving, with the communications transceiver, a wireless signal from the physically separate wireless device indicating that the wireless device has received an incoming communication from a party other than the known calling party;
processing the first wireless signal with the processor to cause one or more of the touch screen user interface, the speaker and the vibrator to emit a first alert according to the first ringer setting, in response to receipt of the wireless signal from the wireless device indicating that the wireless device has received the incoming communication of a first type from the known calling party;
determining the first alert based on the first ringer setting for communications of the first type from the known calling party;
processing the second wireless signal with the processor to cause one or more of the touch screen user interface, the speaker and the vibrator to emit a second alert according to a second ringer setting, in response to receipt of the wireless signal from the wireless device indicating that the wireless device has received the incoming communication of a second type from a party other than the known calling party, wherein the second alert is different from the first alert; determining the second alert based on the second ringer setting for communications of the second type from the party other than the known calling party; and
providing, via the wireless ringer, the first alert according to the first ringer setting, wherein providing the first alert further includes one of interrupting, mixing, or overlaying playback of media content on the wireless ringer with the first alert based on the first ringer setting, wherein the first ringer setting indicates whether to interrupt, mix, or overlay the playback of media content with the first alert, based at least in part on caller identification information.

11. The method of claim 10 further comprising processing the wireless signal with the processor according to the first stored ringer setting to cause at least two of the touch screen user interface, the speaker and the vibrator to emit alerts according to the first ringer setting and in response to receipt, through the communications transceiver, of the wireless signal from the wireless device indicating that the wireless device has received the incoming communication of the first type from the known calling party.

12. The method of claim 10 further comprising processing the wireless signal with the processor according to the first ringer setting to cause each of the touch screen user interface, the speaker and the vibrator to emit alerts according to the first ringer setting and in response to receipt, through the communications transceiver, of the wireless signal from the wireless device indicating that the wireless device has received the incoming of the first type communication from the known calling party.

13. The method of claim 10 further comprising:
receiving the second ringer setting by wireless transmission from the wireless device to the wireless ringer; and
storing the second ringer setting in the memory.

14. A method for extending alerts from a wireless device, comprising:
providing a wireless ringer comprising:
a communications transceiver providing for direct wireless communication between the wireless ringer and a physically separate wireless device;
at least one alert output device;
a memory;
a user interface;
a processor in communication with the communications transceiver, the memory, the user interface, and the alert output device, and a strap providing for attachment of the wireless ringer to the user's wrist;
storing a first ringer setting in the memory using the user interface;
linking the first ringer setting to an identity of a known calling party;
receiving, with the communications transceiver, a first wireless signal from the physically separate wireless device indicating that the wireless device has received an incoming communication from the known calling party;
receiving, with the communications transceiver, a second wireless signal from the physically separate wireless device indicating that the wireless device has received an incoming communication from a party other than the known calling party;
processing the first wireless signal with the processor to cause the at least one alert output device to emit a first alert according to the first stored ringer setting, and in response to receipt of the wireless signal from the wireless device indicating that the wireless device has received the incoming communication of a first type from the known calling party;
determining the first alert based on the first ringer setting for communications of the first type from the known calling party;
processing the second wireless signal with the processor to cause the at least one alert output device to emit a second alert according to a second stored ringer setting, and in response to receipt of the second wireless signal from the wireless device indicating that the wireless device has received the incoming communication of a second type from a party other than the known calling party;
determining the second alert based on the second ringer setting for communications of the second type from the party other than the known calling party; and
providing, via the wireless ringer, the first alert according to the first ringer setting, wherein providing the first alert further includes one of interrupting, mixing, or overlaying playback of media content on the wireless ringer with the first alert based on the first ringer setting, wherein the first ringer setting indicates whether to interrupt, mix, or overlay the playback of media content with the first alert, based at least in part on caller identification information.

15. The method of claim 14 wherein the at least one alert output device comprises a speaker, the method further comprising emitting an audio alert from the speaker according to the first ringer setting and in response to the receipt of the first wireless signal from the wireless device indicating that the wireless device has received the incoming communication of the first type from the known calling party.

16. The method of claim 14 wherein the at least one alert output device comprises a vibrator, the method further comprising vibrating the vibrator according to the first ringer setting and in response to the receipt of the first wireless signal from the wireless device indicating that the wireless device has received the incoming communication of the first type from the known calling party.

17. The method of claim 14 wherein the at least one alert output device comprises a display of the user interface, the method further comprising displaying text on the display according to the first ringer setting and in response to receipt of the first wireless signal from the wireless device indicating that the wireless device has received the incoming communication of the first type from the known calling party.

18. The method of claim 14 further comprising:
receiving the second ringer setting wirelessly transmitted from the wireless device to the wireless ringer; and
storing the second ringer setting in the memory.

* * * * *